Jan. 19, 1926.  1,570,395
B. T. PHILLIPS
SHOCK ABSORBER
Filed Jan. 26, 1925   3 Sheets-Sheet 1
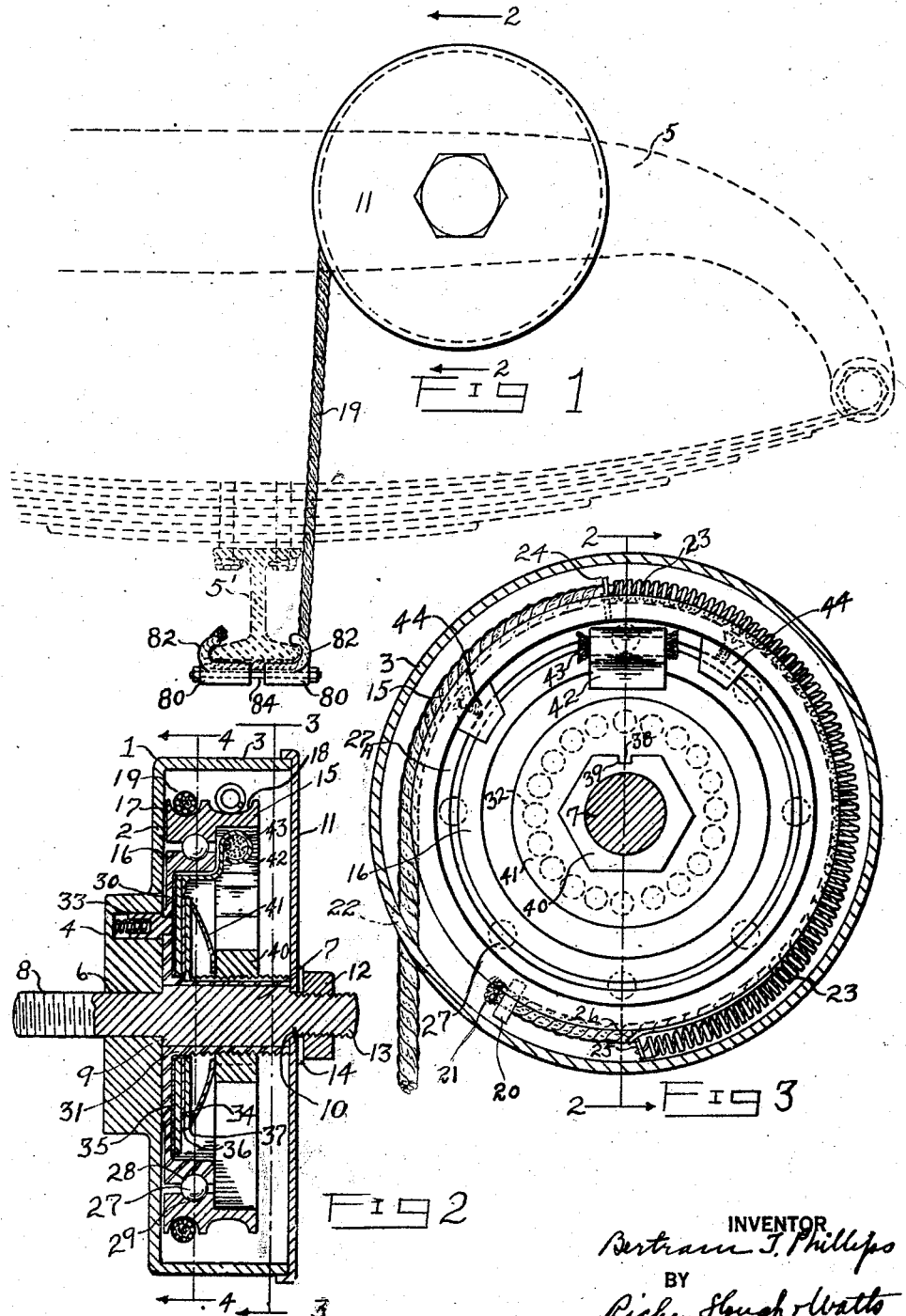
INVENTOR
Bertram T. Phillips
BY
Rickey Slough Watts
ATTORNEY

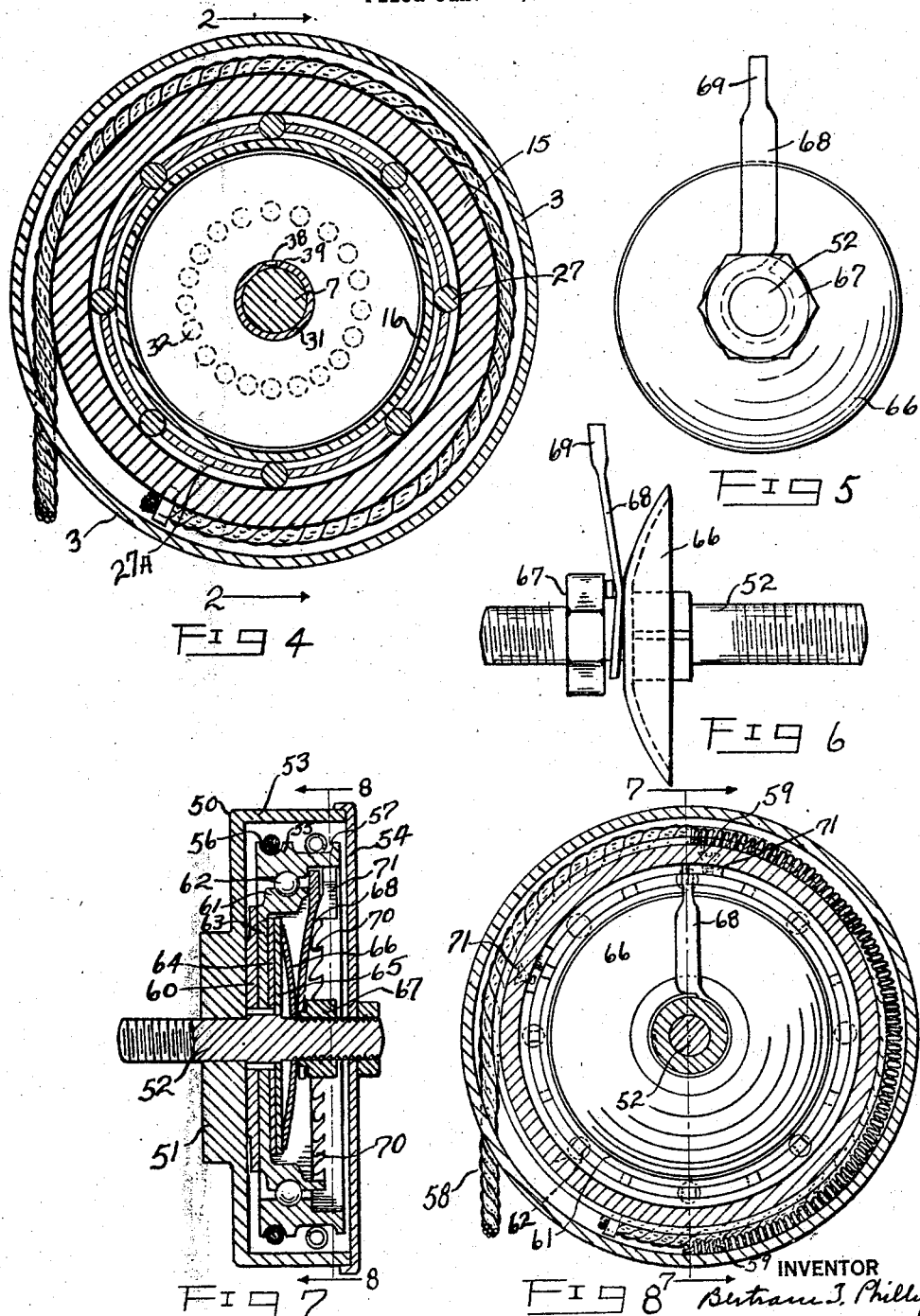

Jan. 19, 1926. 1,570,395
B. T. PHILLIPS
SHOCK ABSORBER
Filed Jan. 26, 1925   3 Sheets-Sheet 3
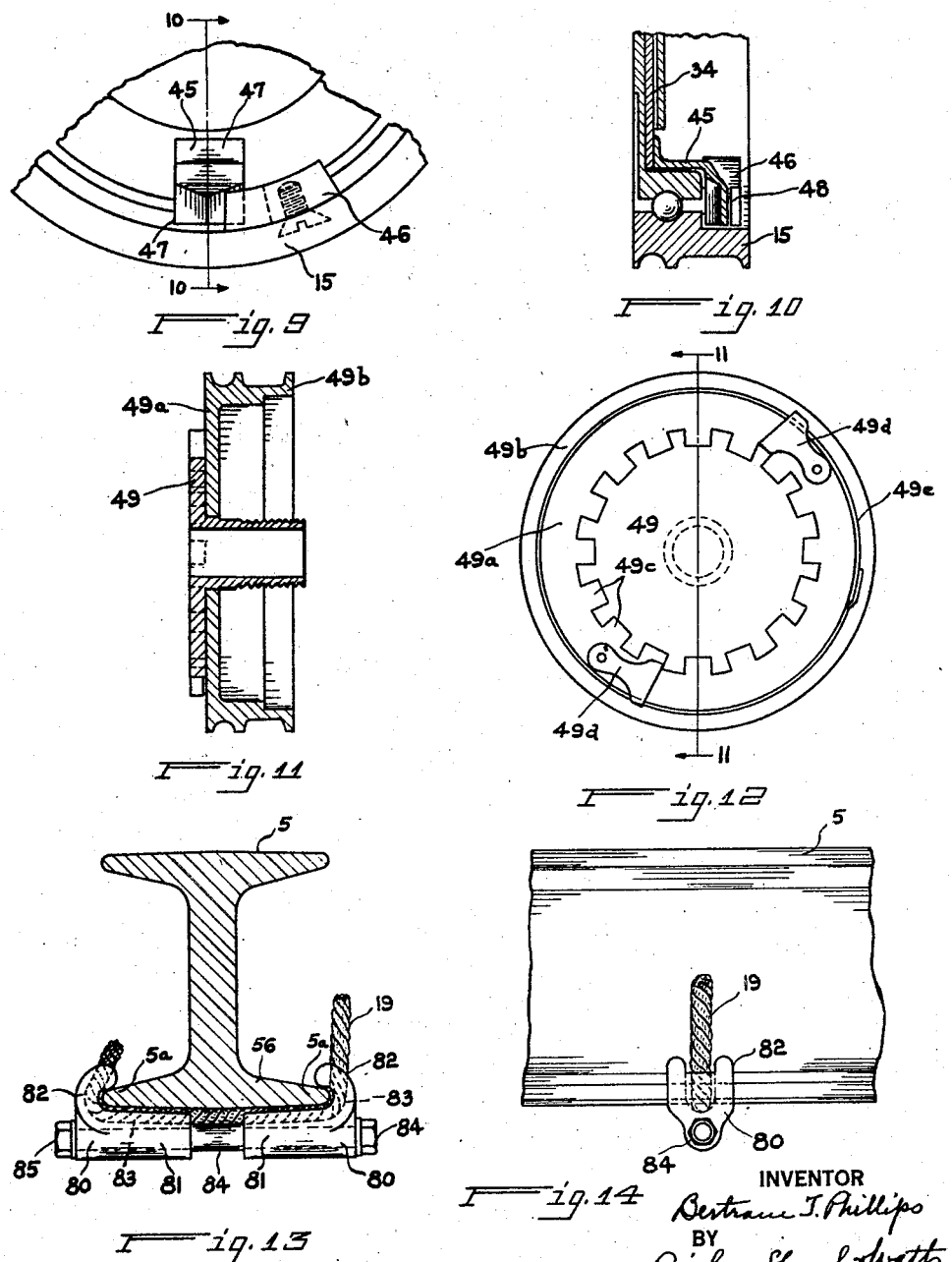

Patented Jan. 19, 1926.

1,570,395

UNITED STATES PATENT OFFICE.

BERTRAM T. PHILLIPS, OF CLEVELAND, OHIO, ASSIGNOR TO WILLIAM H. HUGHES, OF CLEVELAND, OHIO.

SHOCK ABSORBER.

Application filed January 26, 1925. Serial No. 4,702.

*To all whom it may concern:*

Be it known that I, BERTRAM T. PHILLIPS, a citizen of the United States, residing at Cleveland, in the county of Cuyahoga and State of Ohio, have invented certain new and useful Improvements in Shock Absorbers, of which the following is a specification.

This invention relates in general to shock absorbers, and more particularly to such devices for use on automobiles.

One object of the invention is to construct a shock absorber to be connected to two members movable relative to each other, which will automatically adjust itself at once to any change in the original relative position of the members, thereby maintaining substantially uniform tension on the two members.

Another object is to construct a shock absorbing device for two relatively movable members, which will permit a limited amount of free, unrestrained relative movement of the members toward or away from each other and resist a greater amount of movement of one of the members in one direction relative to the other member.

Another object is to construct a shock absorber for automobiles which will automatically adjust itself at once to any load on the springs to maintain substantially constant the tension of the device on the frame and axle, and which will permit limited, free or unrestrained movement of the frame, with respect to the axles, at all loads.

A further object is to construct a shock absorber for an automobile which can be manually adjusted and thereby rendered suitable for use on automobiles of different predetermined weights or loads, and which will automatically adjust itself to variations from any such predetermined load to permit limited, free and unrestrained relative movement of the frame and axle under such load.

A further object is to construct a shock absorber for an automobile which may be manually adjusted for automobiles of different predetermined weights or loads, which will automatically adjust itself to variations from any such predetermined weights or loads to permit limited, free and unrestrained relative movement of the frame and axle, under such load, and which will frictionally resist movement of the frame in one direction, relative to the axles and in excess of the said limited movement, under any variations of predetermined load or weight.

A still further object is to construct a shock absorber for use on automobiles equipped with balloon tires, which will not resist the normal functioning of the automobile springs when the automobile is moving over a moderately uneven roadway, but which will resist excessive and therefore undesirable rebound shocks caused whenever the automobile encounters obstacles or depressions that are sufficiently large to produce sudden movement of the automobile body toward or away from the axles.

Another object is to provide a new and improved form of clamp for securing a shock absorbing cable to an automobile axle.

Other objects will appear and be pointed out hereinafter.

In shock absorbers, and particularly those heretofore constructed for use on automobiles, no provision has ever been made so far as I am aware, for a limited amount of free and substantially unrestrained movement of the automobile frame, body or sill, relative to the axle throughout the life of the absorber. After such devices are installed tension is constantly maintained between the automobile frame and axle which interferes with or in some cases practically destroys the free play or spring action of the springs. With my device, however, provision is made to permit limited free play of the springs at all times.

Furthermore in prior art devices no provision has been made for the automatic adjustment of a shock absorber to variations in the load on the vehicle. With such a device adjusted at the time of installation for a given load any changes in the original load interfere with the proper functioning of the device either by making the tension too great with a lessened load, or not great enough with an increased load. By my invention, however, I have provided a shock absorber which automatically adjusts itself to variations in the original load and thus provides, at all times, for free and unrestricted limited play or relative movement of the automobile frame and axle relative to each other, while continually maintaining the predetermined restraining power of the device.

In the drawing attached hereto and forming a part of this specification:

Fig. 1 shows one form of device embodying my invention as assembled with an automobile frame and axle, the frame, axle and springs being indicated in dotted lines;

Fig. 2 is a vertical section taken on line 2—2 of the device shown in Fig. 1;

Fig. 3 is a vertical section taken on line 3—3 of the device shown in Fig. 2, with certain parts shown in elevation;

Fig. 4 is a section similar to Fig. 3 but taken on line 4—4 of Fig. 2;

Figs. 5 and 6 are, respectively, top and side elevational views of the pawl and associated parts employed in the device shown in Figs. 7 and 8;

Figs. 7 and 8 are views corresponding to Figs. 2 and 3, but showing a modified form of the device embodying my invention;

Figs. 9 and 10 are enlarged detailed views of a modified form of pawl-like member and cam which may be used to replace the corresponding members shown in Figs. 2 and 3;

Figs. 11 and 12 are, respectively, cross sectional and side elevational views of a modified form of pawl and ratchet, and Figs. 13 and 14 are enlarged elevational views showing a clamp constructed in accordance with my invention for attaching the cable of a shock absorber to an axle.

Referring first to Figs. 1 to 4, inclusive, 1 indicates a shell or casing having a disc-like bottom or back 2 and an annular peripheral flange 3. The shell is preferably provided with an integral projection 4 suitably shaped to be connected directly or indirectly to an automobile side frame or sill 5. Obviously this projection need not be integral with the shell but may be separately formed and suitably secured thereto. Projecting through an opening 6 disposed centrally of the shell 1 is a stud 7, which may be sufficiently long to extend through the shell 1, projection 4 and the automobile sill 5, and to receive a nut on the threaded inner end 8 to secure the shell in position on the sill. The stud has a shoulder or enlargement 9 formed thereon within the shell and at its outer end is reduced as at 10 to receive a cover plate 11 and threaded as at 13, the cover plate being held in place by a nut 12 engaging the threads 13 and washer 14.

An outer annular member 15 is disposed in the shell and rotatably carried by antifriction bearings supported by an inner annular member 16, presently to be described. The outer surface of the outer annulus 15 is provided with two circumferentially extending grooves 17 and 18 in the former of which a wire cable 19 is seated, the end of the cable being secured to the annulus by any suitable means, for example, by a hollow lug 20 having a hole sufficiently large to permit passage therethrough of the cable alone, but not of the cable when enlarged as shown at 21. This cable 19 substantially encircles the annulus and projects through a hole 22 suitably provided in the peripheral wall 3 of the shell. In the other circumferential groove 18 a coil spring 23 may be disposed, one end of the spring being attached to the member 15 as by means of a pin 24 secured thereto and the other end of the spring being similarly secured to the side wall of the shell by pin 25. It will be understood that the spring is so disposed on the annular member, with respect to the cable, that when the cable is pulled out of the shell and then released, the spring will restore the annular member to its original position. A thin sheet metal strip 26 attached to pin 25 and extending under the spring 23 may be used to facilitate the contractile action of the spring if desired. Means other than the spring 23 may be employed to return the outer annulus to its original position, as will be understood.

The inner annular member 16 which carries the antifriction bearings 27 is provided with a suitable circumferential groove 28 for the bearings, the inner surface of the outer annular member 15 being provided with a similar groove 29. The antifriction means 27 herein shown are preferably spherical ball bearings suitably spaced apart from each other by the usual ball spacers 27ᴬ. Rollers may obviously be substituted for the ball bearings to perform the same function as the latter.

The inner annulus 16 is preferably formed with a disc 30 integral therewith which disc may have formed at its center an upstanding hollow sleeve 31 suitably sized to have a bearing on the enlarged portion 9 of the stud 7. The disc may have bearing engagement with the adjacent surface of the shell 1. The disc 30 is provided with a number of circumferentially arranged perforations 32 which cooperate with spring pressed cylindrical pawl 33 carried by shell 1 to engage in the perforations 32. The pawl or plunger 33 is formed with an outer end surface inclined at an acute angle to the length thereof so that when the annulus 16 rotates in one direction the pawl will be pressed back into the recess against its spring and the disc thus permitted to slide thereover, while, when rotated in the reverse direction, the pawl will engage in one of the holes 32 in the disc, thereby preventing further rotation of the member 16 with its disc 30.

Disposed within the inner annular member 16 is a disc-like metal friction member 34, and a similarly shaped disc 35 of substantially the same area arranged between disc 30 and member 34 and composed of leather or other friction producing material. A disc 36 similar to member 35 is disposed between a thin metal plate 37 and the outer side of member 34. This plate 37 is keyed to the sleeve 31 as by a key 38 formed thereon to cooperate with a corresponding keyway 39 in the sleeve. The outer surface of the sleeve 31 is threaded and a nut 40 is screwed thereon in engagement with a spring metal disc 41, the outer periphery of which bears against the plate 37. The friction member 34 has an upstanding arm 42 provided with fibre, felt, or other noiseless material 43, to engage with either of two spaced projections 44 on the inner surface of the outer annulus 15.

It will be obvious that variations can be made in the structure just described. For example, as shown in Figs. 11 and 12, I may provide a ratchet wheel 49 secured to the rear face of the disc portion 49$^a$ of annular member 49$^b$ having teeth 49$^c$ formed on its periphery. A pawl 49$^d$ pivoted to the back wall of casing 1 and preferably provided with opposite teeth may engage with these teeth on the ratchet wheel to prevent rotation of member 49$^b$ in either direction, depending upon the position of the pawl. Preferably two pawls are employed, nearly oppositely disposed, one only being in engagement with a tooth on the ratchet wheel at any given time, while the other remains midway between two ratchet teeth, thereby providing for a finer adjustment than when the ratchet wheel may move the full distance between two of its teeth before engaging with a pawl. A spring 49$^e$ encircling the ratchet wheel and pawls 49 and seated in grooves in the pawls serves to maintain the latter in contact with the ratchet wheel.

It will be understood by those skilled in the art that the device shown in Figs. 2 and 3 may be changed from a left handed device to a right handed one, so as to be utilized on either side of an automobile, by simply disassembling the parts within the casing to permit the pawl 33 to be rotated approximately 180°, and in the device of Figs. 11 and 12 by rotating the pawls about 180°.

It will be understood from the foregoing description that although I prefer to employ annular members 15 and 16 provided with ball bearings therebetween, I do not regard such construction as essential, since it is only necessary that the inner and outer members be rotatable. For example, the annular members 15 and 16 may well be constructed as segments of a circle rather than as complete circles. Neither do I wish to be understood as limiting my invention to the particular form of friction members, since obviously various other shapes could be employed satisfactorily.

The operation of the device just described is substantially as follows:

The device is secured to an automobile, as shown in Fig. 1, and nut 40 is manually adjusted to produce the necessary friction between members 34, 35, 36 and 37 as determined by the load or weight of the car. Limited movements of the cable through the shell as caused by movement of the sill and axle relative to each other rotate the outer annulus 15 in either direction, the distance of free rotation depending upon the distance between the inwardly extending projections or cams 44 on the outer annulus and the upstanding arm 42 of the friction member. Such rotational movement of the member 15 is only resisted by the coil spring 23. When, however, the movement of the cable is increased sufficiently to rotate the outer annular member beyond the point where one of the cams engages the arm 42, then the cam bears against the arm and moves the latter and rotates the friction member connected thereto, thereby effecting a new setting of the friction member corresponding to the new load in the car, whether it be greater or less than the original load. After any such automatic repositioning of the friction member the annulus 15 can again act freely within the limited extent provided by the spacing of projections 44 on either side of arm 42. Depending upon the position of the spring pressed pawl 33, movement of the friction member in one of these two directions will be free and unresisted, since annulus 16 and members 34, 35, 36, 37, 40 and 41 rotate as a unit, while movement in the other direction will be against the frictional force exerted upon the friction member by the spring disc 41 and friction parts 35 and 36, the annulus 16 and parts 37, 40 and 41 being held fixed by pawl 33, while friction member 34 is rotated between parts 35 and 36.

The movement of the outer annulus back and forth without movement of the friction member will, as mentioned above, permit slight movements of the automobile sill and axle relative to each other, as may be necessary when the vehicle is passing over a roadway which is only slightly uneven. A greater movement of the outer annular member, for example, when the load of the automobile is changed as by one or more persons getting into or out of the automobile, will move the friction member with it so as to permit the same free and unrestrained relative movement of the sill and axle over slightly uneven roadway with the new load. When the roadway becomes more uneven or rougher so that disagreeable shock or rebound would be transmitted to the body of the automobile, the greater rotational movement of the outer annulus due thereto in one direction and in excess of the limited free movement will be resisted by the friction member.

From the foregoing it will be seen that I have provided a shock absorbing device which will (a) permit free and unrestrained limited movement of two members relative to each other, (b) automatically adjust itself to variations in the initial load imposed on the two cooperating members or to the relative positions of the members, (c) resist abnormal movement of two members in one direction relative to each other and (d) which may be manually adjusted for widely different loads.

Referring now to the modification shown in Figs. 9 and 10, I have shown a modified form of arm which may be used instead of the arm 42 of Figs. 2 and 3. This arm 45 extends upwardly from the friction plate 34 and then outward radially to engage with suitably shaped cams 46 carried by the outer annulus 15. The upper surface of the outwardly projecting portion of this arm may be sloped from either edge towards the center thereof to provide inclined surfaces 47 which engage similarly inclined surfaces 48 on the cams 46. When the outer annulus 15 turns to bring one cam into contact with the arm 45 the sloping surface 48 of the cam engages the top 47 of the arm 45, and when the annulus is rotated in the opposite direction the other cam similarly engages with the other surface 47 of the arm 45. The contact of the cams with the arm is thus rendered substantially noiseless without the use of any sound proof material, such as fibre, felt, etc., since the sloping surfaces will engage one another with a sliding noiseless contact rather than with the sound of a direct blow where two parallel surfaces are brought together.

Referring now to Figs. 5 to 8, inclusive, I have shown a shell 50 having a rearwardly extending portion 51 to be connected to an automobile sill, and a shouldered stud 52 which may bear against the inner face of the shell and extend therethrough and through the sill, and be threaded at the far end to receive a nut to bear against the sill and secure the shell in place. The casing or shell 50 has upstanding peripheral side walls 53 and carries a cover plate 54. Within the shell is disposed an annular member 55 provided on its outer surface with circumferentially extending grooves 56 and 57 to receive a cable 58 extending through the side wall of the shell and secured at one end to the annulus 55 In the other groove 57 may be disposed a coil spring 59 secured at one end to the annulus 55 and at the other end to the side wall of the shell. The foregoing structure is similar in substantially all respects to that described hereinabove and shown in Figs. 1 to 4, inclusive. Within the shell and bearing against the inner surface thereof is a leather or other disc-like member 60 composed of suitable friction material. An inner annular member 61 carrying on its outer surface suitable antifriction means 62, which engage the inner surface of the outer annulus 55, has a disc-like portion extending inwardly therefrom, which portion bears against the friction disc 60 with one surface and against another friction disc 64 with the other surface. A metal disc 65 is keyed to the stud 52 and a spring disc 66 surrounds the stud and is adjustable with respect to the disc by means of a nut 67 which engages the threaded end of the stud 52. The nut may be manually adjusted on the stud to increase or decrease the spring force of the member 66 against the disc 65 and correspondingly to alter the frictional resistance offered by the members 60 and 64 to rotation of the inner annular member relative thereto. A pawl 68 is loosely carried between the spring disc 66 and the nut 67 and extends radially outward beyond the inner annulus 61. Its outer end 69 is preferably rounded to engage in teeth 70 formed in the inner edge of the inner annular member 61. The outer annulus carried two cams 71 spaced apart from each other having, respectively, oppositely inclined surfaces to engage with the rounded end of the pawl. Movement of one cam toward the pawl will raise the pawl out of a tooth 70, lift it thereabove and may carry it therebeyond. The other cam has a surface bearing against the outer side of the rounded end of the pawl to force the latter into engagement with a tooth when the annulus is rotated.

The operation of the device shown in Figs. 5 to 8, inclusive, resembles that of the device shown in Figs. 1 to 4. The cams 71 being spaced apart from each other, permit limited rotational movement of the outer annular member without disturbing the pawl or the inner annular member. Movement of the outer annular member in one direction, beyond the limited free movement permitted by the cams, will result in movement of the inner annular member under the force of the pawl 68 and cam 71 between the friction members 60, 64, 65 and 66, and relative thereto, and will be frictionally resisted by these members. Rotational movement of the outer annulus in the opposite direction beyond the permissible free play amount results in movement of the pawl with respect to the inner annulus and, in effect, constitutes a resetting of the pawl.

In Figs. 13 and 14 I have shown a clamp especially suited for securing a shock absorber cable to the axle of an automobile, although the device is of general utility in securing rope or cable to members of various shapes. The clamp consists of two substantially similar parts 80 each of which has a portion 81 extending on one side of the sill 5' and an upright portion 82 curved to correspond to the edge of the flange 5ᵃ of the sill and bear on the sloping surface 5ᵇ thereof. Preferably the portion 82 is bifurcated at its free end to receive the rope or cable 19, the cable resting in a groove 83 in the members 80 which groove is of less depth than the diameter of the cable 19, so that with the cable and parts 80 in the position shown in Figs. 11 and 12, these parts may clamp the cable 19 against the side of the sill 5' or both when the nut 85 is tightened on the bolt 84, which extends through both of the members 80 and draws the latter together. It will be noted that clearance is provided between the sill 5' and all of the adjacent surfaces of members 80, so that movement of the members 80 toward one another on bolt 84 is permitted and may be followed by movement of the members 80 toward the side and edge of the sill.

Having thus described my invention so that those skilled in the art may be enabled to practice the same, what I desire to secure by Letters Patent is defined in what is claimed, it being understood that various changes and alterations not amounting to invention may be made in the structures hereinabove shown and described in detail without departing from the spirit of my invention.

What is claimed is:

1. A shock absorber comprising in combination an annular member, two relatively movable members, the said annular member and the second of the said two relatively movable members being rotatable in either direction, the first of said two relatively movable members being rotatable in one direction only, interengaging means on the said annular member and the second of the said relatively movable members to permit limited movement of the said members with respect to each other and to cause simultaneous movement of the two members beyond the limited amount of movement permitted by the interengaging parts, and means cooperating with the said two relatively movable members for frictionally resisting rotation of the said annular member beyond the said limited amount.

2. A shock absorber comprising in combination an annular member and a frictional member operatively connected together for limited relative movement, the two members being freely rotatable together in one direction, the said friction member being rotatable with, but frictionally restraining unlimited rotational movement of the said annular member in the other direction.

3. A shock absorber comprising an outer annular member rotatable substantially without friction in one direction, means to rotate the same, an inner annular member, antifriction bearings spacing the said annular members apart, a rotatable friction member within the inner annular member and cooperating with the outer annular member to permit limited free rotational movement thereof relative to the friction member.

4. A shock absorber comprising an outer annular member rotatable substantially without friction in one direction, means to rotate the same, an inner annular member, antifriction bearings spacing the said annular members apart, a rotatable friction member within the inner annular member and cooperating with the outer annular member to permit limited rotational movement thereof relative to the friction member, and to restrain rotational movement of the outer member in one direction in excess of the said limited movement.

5. In combination in a shock absorber, rotatable inner and outer members, a rotatable friction member, the three said members being freely rotatable in one direction, means for preventing rotation of the said inner member in the other direction, means for rotating the outer member, the outer member having a lost motion connection with the said friction member for permitting limited free rotation of the outer member in either direction relative thereto, and means cooperating with the said inner and friction members to resist frictionally the rotation of the outer member in one direction in excess of the said limited free rotation.

6. A shock absorber comprising in combination an outer member and a friction member mounted for rotation in either direction and having a lost motion engagement with each other in either direction, an inner member mounted for rotation in only one direction and means for resisting rotation of the outer member in a direction opposite to that of the inner member including friction means operatively engaging the said inner and friction members.

7. A shock absorber comprising a casing, outer and inner members rotatably mounted therein, a rotatably friction member having an arm, spaced projections on the outer member to engage the arm, means to rotate the outer member in either direction and means to prevent rotation of the inner member in one direction, the rotation of the outer member in one direction with the friction member being frictionally resisted by the latter.

8. A shock absorber comprising a metal casing, an outer annulus rotatably mounted in the casing, an inner annulus rotatably mounted in the casing within the outer annulus, a friction member frictionally engaging the said inner annulus and having an outwardly projecting arm, spaced projections on the outer annulus to engage the said arm, and means to rotate the outer annulus to cause engagement of one of the said projections with the said arm on the friction member.

9. A shock absorber comprising a casing, an outer annulus rotatably mounted therein, an inner annulus rotatably mounted within the casing and outer annulus and having a disc integral therewith, a friction member including a metal disc and friction producing members on either side thereof, the said friction member being disposed within the said inner annulus and having an arm projecting radially therebeyond, spaced projections on the outer annulus cooperating with the said arm, the said outer annulus being rotatable for a limited distance in either direction before engaging with the said arm, and the said arm and friction member being freely rotatable with the outer annulus in one direction.

10. A shock absorber comprising a casing having a detachable cover, a centrally disposed stud in the casing, a sleeve having bearing engagement on the stud and formed integrally with a disc and annulus, alternately arranged metal and friction discs about the said sleeve and within the annulus, one of the said metal discs having a radially extending arm, means for manually varying the frictional contact of the said metal and friction discs and the disc of the said annulus, an outer annulus rotatably carried by antifriction means on the said inner annulus, projections on the outer annulus to engage the said arm, means for rotating the said outer annulus, and means for preventing rotation of the inner annulus in one direction.

11. A shock absorber comprising a metal casing having a detachable cover, a stud centrally disposed therein, a sleeve rotatably mounted on the stud and formed integrally with a disc and inner annulus, a friction producing disc about the sleeve and engaging the disc, a disc-like friction member about the sleeve and bearing on the said friction producing member, a second friction producing disc bearing against the friction member, a metal disc keyed to the said sleeve and bearing on the said second friction producing member, an adjustable spring plate bearing against the said keyed plate, antifriction bearings on the outer surface of the said inner annulus, an outer annulus carried by the said bearings and having projections engaging the said arm of the friction member, means for rotating the outer annulus in either direction, and means carried by the casing for preventing rotation of the inner annulus in one direction.

12. A shock absorber comprising in combination an outer member rotatable in either direction, a cup-shaped inner member having an outer annular flange and disposed within the outer member and spaced radially apart therefrom, the said inner member being rotatable in one direction, friction means disposed within the inner member and spaced radially apart from the said annular flange, and means cooperating with the said friction means and outer member to resist rotation of the outer member in one direction.

13. A shock absorber comprising in combination an outer member rotatable in either direction, an inner member disposed within the outer member and rotatable in one direction, the said inner member including a flange at its outer periphery, and means spaced radially apart from and inwardly of the said flange of the inner member, the said means cooperating with the inner and outer members frictionally to resist rotation of the outer member in one direction.

14. A shock absorber comprising in combination an inner member composed of a disc having a flange at its outer periphery, antifriction means carried on the outer surface of the said flange, an outer member supported by the said antifriction means on the flange for rotation in either direction, and means disposed within the said flange, engaging the disc of the inner member, and cooperating with the outer member frictionally to resist rotation of the outer member in one direction.

15. A shock absorber comprising in combination an inner member rotatable in one direction and composed of a disc having a flange at its outer periphery, antifriction means carried on the outer surface of the said flange, an outer annular member surrounding the said flange of the inner member and supported by the said antifriction means on the flange for rotation in either direction, and means disposed within the said flange, engaging the disc of the inner member, and cooperating with the outer member frictionally to resist rotation of the outer member in one direction.

16. A shock absorber comprising in combination an outer member rotatable in either direction, a cup-shaped inner member having an outer peripheral flange, the said inner member being rotatable in one direction and being disposed inwardly of and spaced radially apart from the said outer member, a friction member rotatable in either direction and disposed within the said inner member and spaced radially apart from the said peripheral flange thereof, and interengaging means connecting the said outer member and the said friction member for simultaneous movement thereof, and for frictionally resisting rotation of the said outer member.

17. A shock absorber comprising a casing having an integral back and side wall and a detachable cover, a stud projecting into the said casing from the back wall, an inner member composed of a disc having a flange at its outer periphery, the said inner member being rotatable about the said stud in one direction, antifriction members disposed on the outer surface of the said flange, an outer member supported on the said antifriction means for rotation about the said stud in either direction, and a member disposed within the said inner member and spaced radially apart from the said flange thereof for frictionally resisting rotation of the outer member in one direction.

18. A shock absorber comprising in combination, an outer member rotatable in either direction, a cup-shaped inner member having an outer annular flange and disposed within the outer member and spaced radially apart therefrom, the said inner member being rotatable in one direction, friction means disposed within the inner member and spaced radially apart from said annular flange, and means cooperating with the said inner member and outer member in a manner to cause the friction means to resist frictionally the rotation of the outer member in one direction.

In testimony whereof I hereunto affix my signature this 23rd day of January, 1925.

BERTRAM T. PHILLIPS.